United States Patent
van der Lely et al.

[19]

[11] Patent Number: 6,118,118
[45] Date of Patent: Sep. 12, 2000

[54] SENSOR APPARATUS AND METHOD TO SCAN SEPARATE OVERLAPPING SPACE VOLUMES TO LOCATE OBJECT THEREIN

[75] Inventors: Alexander van der Lely, Rotterdam; René Fransen, Vlaardingen, both of Netherlands

[73] Assignee: Maasland N.V., Maasland, Netherlands

[21] Appl. No.: 09/299,105

[22] Filed: Apr. 19, 1999

Related U.S. Application Data

[63] Continuation of application No. PCT/NL98/00460, Aug. 13, 1998.

[30] Foreign Application Priority Data

Aug. 20, 1997 [NL] Netherlands ............................ 1006804

[51] Int. Cl.[7] ............................................... A01J 5/04
[52] U.S. Cl. ........................................ 250/221; 119/14.08
[58] Field of Search ................................ 250/221, 222.1; 119/14.08, 14.14

[56] References Cited

U.S. PATENT DOCUMENTS

4,726,322  2/1988  Torsius ................................. 119/14.14
5,042,428  8/1991  van der Lely et al. ............... 119/14.08
5,729,284  3/1998  van der Lely et al. ............... 119/14.08

*Primary Examiner*—Stephone B. Allen
*Attorney, Agent, or Firm*—Penrose Lucas Albright

[57] ABSTRACT

A sensor apparatus for determining the position of the teat of an animal to be milked present in a space relative to the sensor apparatus. The sensor apparatus is provided with two transmitter elements which are affixed to a housing and produce a ray or beam of rays received by a directional element which is a rotating mirror. The directional element directs the ray or beam of rays to two side-by-side sectors which overlap by two degrees. Reflections are received by two receiver elements spaced below the transmitter element via lenses. Mirrors affixed to the housing reflect the rays or beams of rays from the transmitter elements to the directional element which also transmits via such mirrors reflections of the teat from the ray or beam of rays to lenses included in the receiver elements. The receiver elements convert the reflections into signals which are evaluated to determine the position of the teat relative to the housing. The rays or beam of rays are directed by the directional element through a window transparent to the ray or beam of rays which coincides with a semi-cylindrical surface having an axis substantially the same as the axis of rotation of the directional member.

51 Claims, 4 Drawing Sheets

SENSOR APPARATUS AND METHOD TO SCAN SEPARATE OVERLAPPING SPACE VOLUMES TO LOCATE OBJECT THEREIN

RELATED APPLICATION

This Application is a continuation of International Application No. PCT/NL98/00460, filed Aug. 13, 1998.

FIELD OF THE INVENTION

The invention relates to a sensor apparatus for determining the position of an object present in a space, in particular a teat of an animal to be milked, relative to the sensor apparatus. This sensor apparatus is provided with at least one transmitter element and at least one receiver element which is designed to receive a ray or beam of rays reflected by the object. It also comprises a first directional element for directing the ray or beam of rays emanating from the transmitter element consecutively to different areas in that space or for directing the ray or beam of rays emanating from the object to the receiver element, or both. The invention also relates to a method of determining the position of an object, to a milking apparatus and to a search device for the milking implement.

BACKGROUND OF THE INVENTION

A publication, EP-A-0360354 (U.S. Pat. No. 5,042,428 of Aug. 27, 1991), discloses a sensor apparatus for determining the position of an object, such as a teat, in a space. The sensor is provided with a transmitter element or elements and a receiving element or elements which receive a ray or beam of rays reflected from the object. A directional element directs the ray or beam from the transmitter element to different areas in the space or directs reflections to the receiving element, or both. EP-A-0360354 also discloses a method for determining the position of an object in space which uses the above apparatus which includes evaluating reflections by means of an evaluation device which determines the location of the object relative to the sensor apparatus. In accordance with said publication, for the purpose of scanning the space by means of a laser beam, the housing of the sensor apparatus with the transmitter and receiver elements fixedly arranged therein is pivoted in a reciprocating manner by motor drive through the desired scanning angle.

SUMMARY OF THE INVENTION

In a first aspect of the invention, an objective is to provide a sensor apparatus having compact dimensions. In a second aspect of the invention, the provision of a large scanning angle, preferably at least approximately 100°, and more preferably approximately 120° to 140° is an objective. A third aspect of the invention is to achieve scanning while using a minimum of moving parts. In a fourth aspect of the invention, the objective is to obtain reliability in operation. A fifth aspect of the invention is to reduce manufacturing cost and a sixth aspect of the invention is to minimize maintenance. In a seventh aspect of the invention, the object is to provide long operational life. In an eighth aspect of the invention, a rapidly operating apparatus is the objective.

One or more of the above-mentioned or further objectives of the invention are achieved on the one hand by means of an apparatus of the type involved, which is characterized by means for scanning the space substantially simultaneously in at least two subareas, and by means of the method carried out by the apparatus, and on the other hand by means of an apparatus of the type described, which is characterized in that the directional element is designed to scan the space, in the situation of an at least substantially fixed transmitter element, by means of the ray or beam of rays emanating therefrom, and by means of the method so performed by the apparatus. In particular the combination of the two aforementioned apparatus according to the invention results in a particularly compact embodiment having, advantageously, a minimal width, a relatively wide scanning angle and a minimum of moving mass.

The invention further relates to optimizing the function of the sensor apparatus.

BRIEF DESCRIPTION OF THE DRAWINGS

In what follows the invention is explained in further detail on the basis of non-limiting exemplary embodiments and with reference to the accompanying drawings, in which.

DETAILED DESCRIPTION OF THE PREFERRED EMBODIMENTS

FIGS. 1, 2, 3 and 4 are drawn to scale. Functionally corresponding parts in the drawings are indicated by the same reference numerals.

Figure 1:
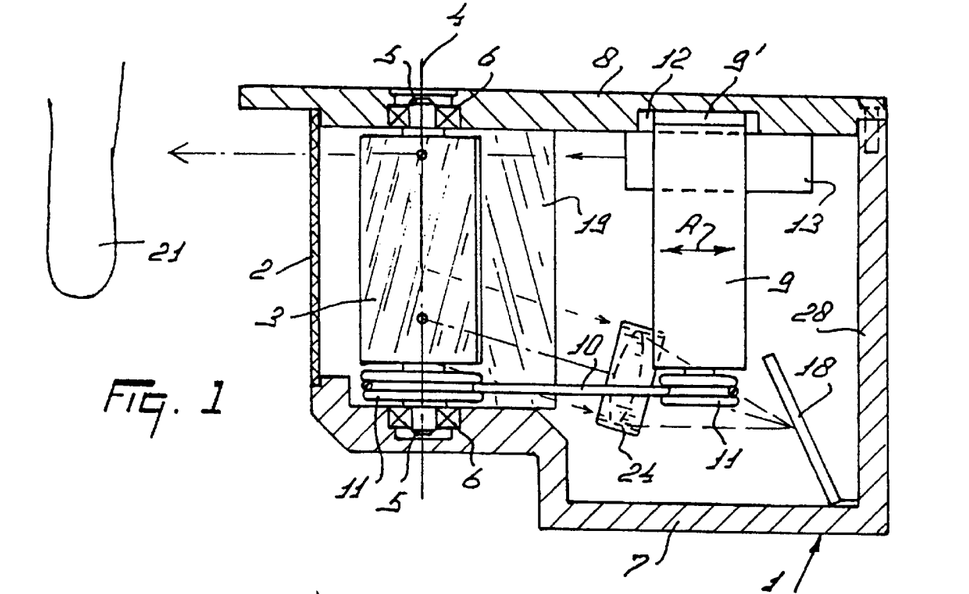
FIG. 1 is a cross-sectional side elevational view of a first embodiment of the sensor apparatus according to the invention.
Figure 2:
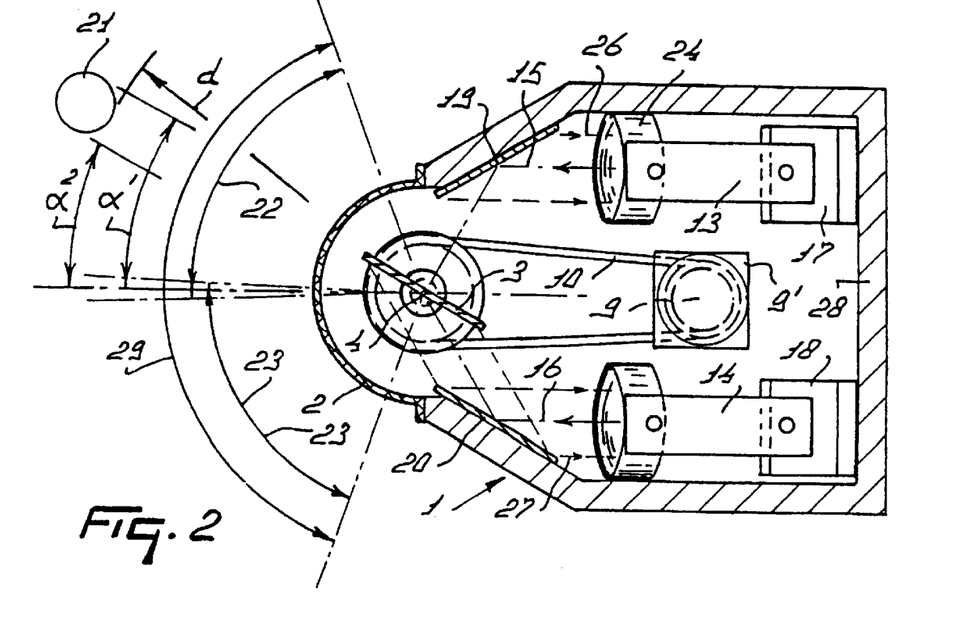
FIG. 2 is a cross-sectional plan view of the apparatus shown in FIG. 1.

The embodiment shown in FIGS. 1 and 2 comprises a housing having walls composed of material which is impenetrable to the relevant ray or beam of rays, such as material which is light-proof to e.g. laser (IR) light, and provided at its front side with an opening or window comprising a plate, such as a glass plate 2, which is penetrable to the relevant ray or beam of rays. Said plate may also be composed of a suitable synthetic material. The window may be open as well, in which case, however, dust and dirt will easily penetrate into housing 1 and contaminate same. Behind plate 2 is arranged a directional element constituted by a rectangular reflector 3 reflecting at its two principal faces the relevant ray or beam of rays. Alternatively, the directional element may be a light-transmitting one, such as a movable prism or a movable beam of glass fiber cables, or a fixed screen having a refractive index controllable by, for example, a variable difference in voltage so that it directs a ray or beam of rays in the space wherein the object to be detected is located. Reflector 3 shown here has a width of approximately twenty-five millimeters, a height of approximately forty millimeters and a thickness of approximately one millimeter, and its reflective sides are preferably very flat. Reflector 3 is rotatable about its longitudinal central axis 4 and is bearing-supported for that purpose, by means of shafts 5 disposed at its short sides, in bearings 6 in the bottom 7 and in the cover 8 of housing 1. In this embodiment reflector 3 is driven in rotation via a belt 10 by a drive element designed as an electric motor 9. Belt 10 runs over a pulley 11 which is coupled to electric motor 9 and to reflector 3 respectively. Tightening of endless drive member 10 is adjustable by means of a slidable connection of motor 9 to cover 8, for which purpose cover 8 is provided in this case with a recess 12 in which is mounted the base 9' of motor 9, which base 9', seen in plan view (FIG. 2), has a rectangular shape, and which recess 12, in the directions of the arrow A (FIG. 1), is longer than base 9' of motor 9, whereas, in the direction perpendicular to that according to arrow A, the size of recess 12 is such that base 9' of motor is closely received. Alternatively, reflector 3 may also be driven directly by drive element 9 without the intermediary of drive member 10. In such case one of shafts 5 may be coupled co-axially to a shaft 5 of motor 9. Preferably, reflector 3 rotates continuously in the same direction at least substantially at the same speed, so that its drive is lightly loaded and non-sensitive to wear.

As shown in FIG. 2, on both sides of motor 9 transmitter elements in the form of laser diodes 13 and 14 are arranged. Below each transmitter element 13 and 14, a respective receiver element 17 and 18 is provided which is designed in this situation as a so-called CCD. The transmission wavelength of both diodes 13 and 14 is preferably in the range of 600–900 nm, more preferably in the range of 780–830 nm, the transmission frequencies of the transmitter elements 13 and 14 mutually differing to such an extent that no disturbing interference occurs when the rays or beams of rays 15 and 16 emanating from transmitter elements 13 and 14 cross one another. Furthermore the frequency difference is such that the sensitivity of each receiver element 17 and 18 can reliably be attuned to the ray or beam of rays 15 and 16 respectively emanating from the transmitter elements 13 and 14 respectively, located directly above, in order to avoid interference also in this manner as much as possible. Alternatively, instead of the transmission frequency, the transmission amplitude of transmitter elements 13 and 14 may differ as well. Difference in modulation of the transmitted signals is also possible. In addition, the rays or beams of rays 15 and 16 respectively, emanating from transmitter elements 13 and 14, may also be sent through housing 1 at different levels, so that they strike directional element 3 in another range of height, thus avoiding at the same time disturbing interference. Other differences in properties of the two rays or beams of rays 15 and 16 are possible for preventing disturbing effects of interference, such as by using combinations of two or more of the aforementioned measures.

In this situation the two rays or beams of rays have directional element 3 in common. Alternatively, there may be applied a separate directional element 3 for each ray or beam of rays, which separate directional element 3 may then pivot in a reciprocating manner through a limited angle such as approximately 75°.

After leaving the respective transmitter element 13 or 14, the mutually substantially parallel rays or beams of rays 15 and 16 strike a respective deflection element 19 or 20 for the purpose of being deflected to directional element 3 arranged between these deflection elements 19 and 20. Each deflection element is constituted here by a reflector 19 or 20 disposed at an angle of approximately 30° with the incident ray or beam of rays 15 and 16 respectively. Alternatively, a respective prism or beam from glass fiber cables may be used as well. Between each deflection element and the respective receiver element 17 and 18 a focusing element or converging element is arranged, in this embodiment constituted by lenses 24 and 25, which perform a function to be explained hereafter. The directional element is capable of directing each ray or beam of rays 15 and 16 to pivot through respective angle sectors 22 and 23 in the space involved for determining the position of a teat 21 of an animal to be milked in that space. In the present embodiment, each angle sector 22 and 23 is 72°, the angle sectors 22 and 23 overlapping each other by 2°, so that the total angle area 29 to be scanned in the space is 140°. Due to the fact that each ray or beam of rays 15 and 16 is a laser beam, the angle sectors are, perpendicular to their plane, at least substantially non-diverging, apart from some dispersed radiation. The radiation of the ray or beam of rays 15 and 16 reflected or dispersed from the space is received as a reflection beam 26 or 27 by directional element 3 and directed to the respective receiver element 17 or 18 via a respective deflection element 19 or 20. Each reflection beam 26 and 27 passes through a respective lens 24 and 25, so that the relatively wide reflection beam 26 or 27 is concentrated on a local area of the receiver element. Because of the fact that in this embodiment each lens 24 and 25 has a fixed focal distance and is in a fixed position relative to the respective receiver elements 17 and 18, the place where teat 21 is depicted on each of receiver elements 17 and 18 and the size of that picture are related to the position of teat 21 in the space. Each of receiver elements 17 and 18 supplies a corresponding signal, depending on the nature of the signal and its further processing possibly by intermediary of an analog-to-digital converter, to an evaluation device which may be a microprocessor. The principle of scanning teat 21 with the aid of a ray or beam of rays to be directed consecutively to different areas in the space, and the processing of the signals obtained by means of the sensor apparatus, in particular what is described and shown regarding FIGS. 7–11, are set out in detail in EP-A-0360354, which publication is incorporated by reference herein. It should be clear that the disclosure of said publication applies here to each individual subsector 22 and 23. The angles $\alpha 1$ and $\alpha 2$ indicated in FIG. 2, which are also indicated in FIG. 8 of that publication, may, for example, be determined in an evaluation device (see e.g. FIG. 7 in EP-A-0360354) on the basis of the place where the object 21 is depicted on receiver elements 17 and 18. The distance d between the object and the sensor apparatus may be determined in an evaluation device on the basis of the size of the picture of the object on receiver elements 17 and 18. By updating the relative position of directional element 3 by, for example, coupling motor 9 to a pulse generator supplying a pulse per section of the revolution, such as each 1°, the position of directional element 3 at the moment when a ray or beam of rays strikes receiver element 17, and consequently the angles $\alpha 1$ and $\alpha 2$, may be deduced by simple calculation in a microprocessor or the like. When teat 21 is located in the other angle sector 23, the ray or beam of rays will of course emanate from the transmitter element 14 and strike the receiver element 18.

For the purpose of synchronizing or resetting directional element 3, one or both rays or beams of rays 15 and 16 can be directed such that in a predetermined position of directional element 3 a ray or beam of rays 15 or 16, without leaving the apparatus, returns via directional element 3 to its respective transmitter element or the other transmitter element 13 or 14, so that the relevant transmitter element 13 or 14 is affected thereby, which affect can be measured on the basis of variations in the current consumption of the transmitter element involved, 13 or 14.

For minimizing interference between the rays or beams of rays 15 and 16 emanating from transmitter elements 13 and 14 and the reflected beams 26 and 27 emanating from directional element 3, each transmitter element or all the transmitter elements 13 and 14 and each of the respective receiver elements 17 and 18, seen in the vertical height of housing 1 (the direction from bottom 7 to cover 8), are spaced apart as much as possible. To that end the reflected beams 26 and 27 extend obliquely relative to the surface of cover 8, and each of receiver elements 17 and 18 is substantially located below directional element 3. Each ray or beam of rays 15 and 16 extends substantially parallel to the surface of cover 8.

Figure 3:
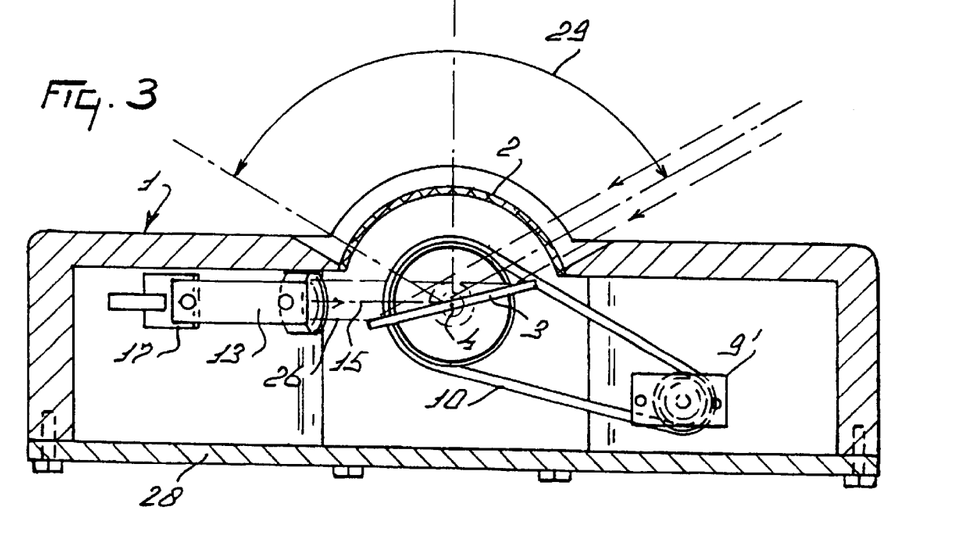
FIG. 3 is a cross-sectional plan view of a second embodiment of the sensor apparatus according to the invention.
Figure 4:
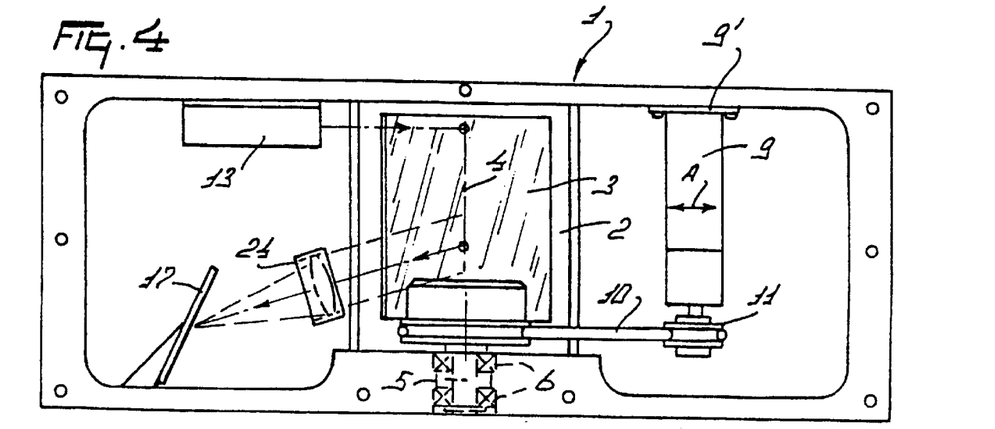
FIG. 4 is a cross-sectional rear elevational view of the apparatus shown in FIG. 3.
Figure 5:
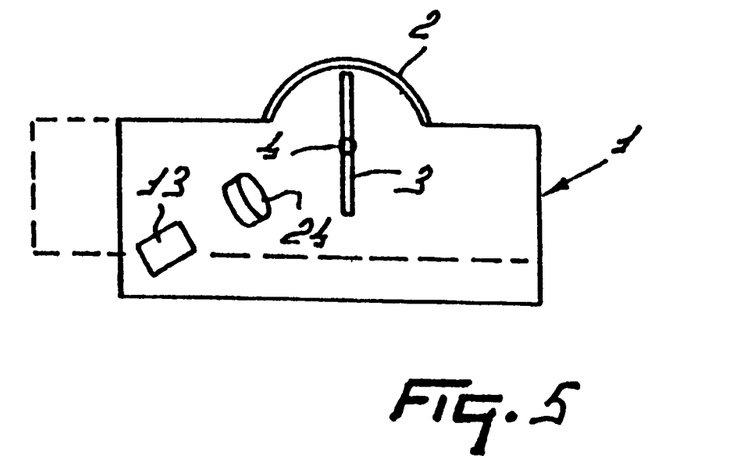
FIG. 5 is a plan view which illustrates an alternative to the embodiment shown in FIG. 3.

FIGS. 3 and 4 show a variant of the invention, in which only one ray or beam of rays 15 is produced. Housing 1 has a height of eighty millimeters, a depth of forty millimeters and a width of one hundred, fifty millimeters. Rear wall 28 is detachable. Directional element 3 is now bearing-supported on one side. The ray or beam of rays 15 emanating from transmitter element 13 extends at least substantially parallel to rear wall 28 or, in other words, at least substantially perpendicular to the center line of an angle area 29, seen in plan view (FIG. 3), and impacts directly on directional element 3. By means of this arrangement an angle area 29 of 140° can be covered; however, this is accomplished with a considerably larger housing 1 in comparison with FIGS. 1 and 2. Belt 10 can now be stretched due to the fact that the mounting 9' of motor 9 has slotted holes through which fastening means (screws) are passed, which fastening means are fixed in upper side 8 of the housing. FIG. 5 shows an alternative to the embodiment of FIGS. 3 and 4, in which the ray or beam of rays 15 and reflection beam 26 respectively, between the directional element 3 and the transmitter element 13, and the receiver element 17 respectively, enclose an angle of approximately 20° with the front wall. However, the angle area to be covered in the space by the ray or beam of rays is now limited to approximately 120°. In comparison with housing 1 according to FIGS. 3 and 4 (as shown to scale by dash lines in FIG. 5), the housing of the variant according to FIG. 5 is smaller and deeper.

Figure 6:
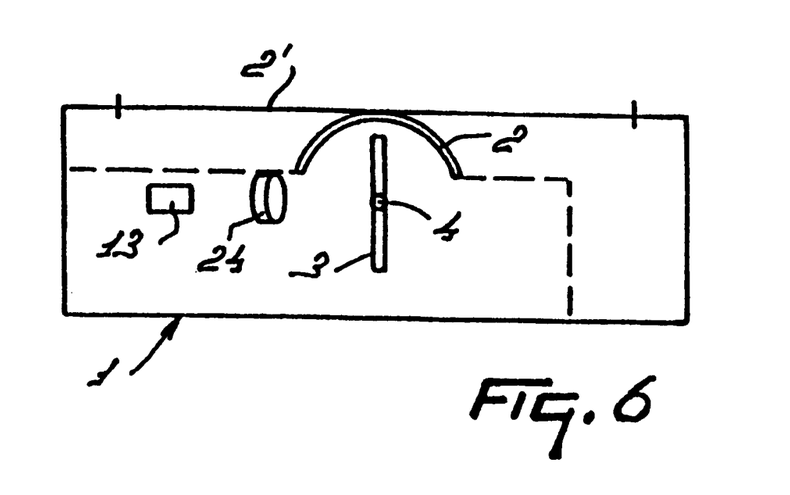
FIG. 6 is a plan view that illustrates another alternative to the embodiment shown in FIG. 3.

In FIGS. 1, 2, 3, 4 and 5, glass plate 2 is curved on one side, while the center of the curvature of glass plate 2 coincides at least substantially with axis 4. Consequently, the ray or beam of rays pass at least substantially perpendicularly through glass plate 2, so that disturbing reflection is avoided as much as possible. Furthermore, housing 1 can be as compact as possible for a given volume of the area to be covered by means of the rays or beams of rays 15 and 16. FIG. 6 illustrates schematically an embodiment having a flat glass plate 2', for the purpose of clearly explaining the difference in size of housing 1 when the latter has a curved glass plate 2 instead of a flat glass plate 2', in one and the same angle scanning. The front side and the lateral side of housing 1 having a curved glass plate 2 is shown by dash lines. It should be noted that the flat closing means 2' for the window for passage of the ray or beam of rays relates to the inventive concept.

Figure 7:
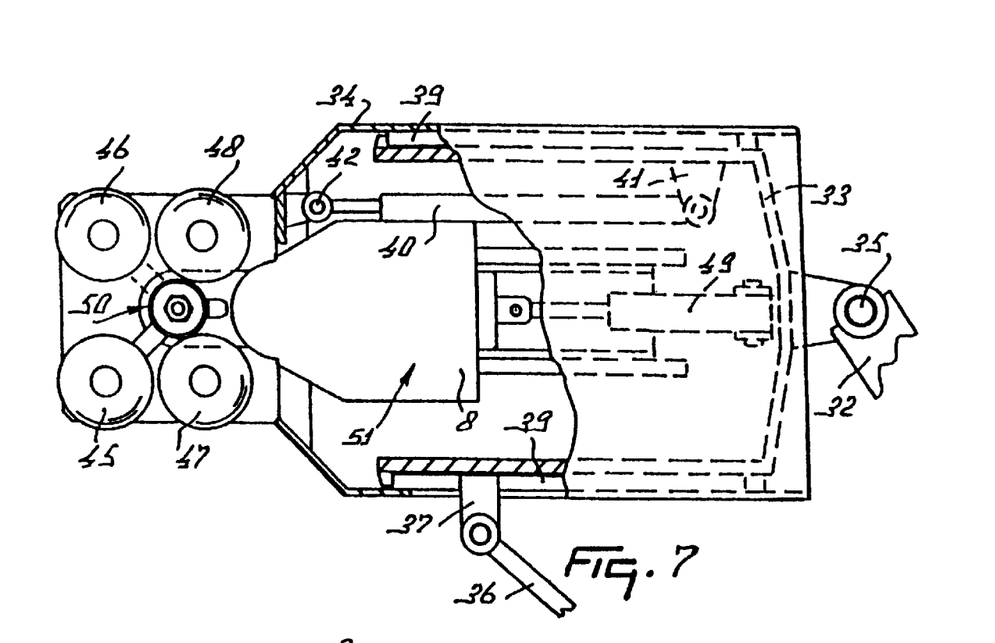
FIG. 7 is a partly broken cross-sectional plan view that shows the application of the sensor apparatus in FIGS. 1 and 2 in a milking apparatus, partially showing the inside.
Figure 8:
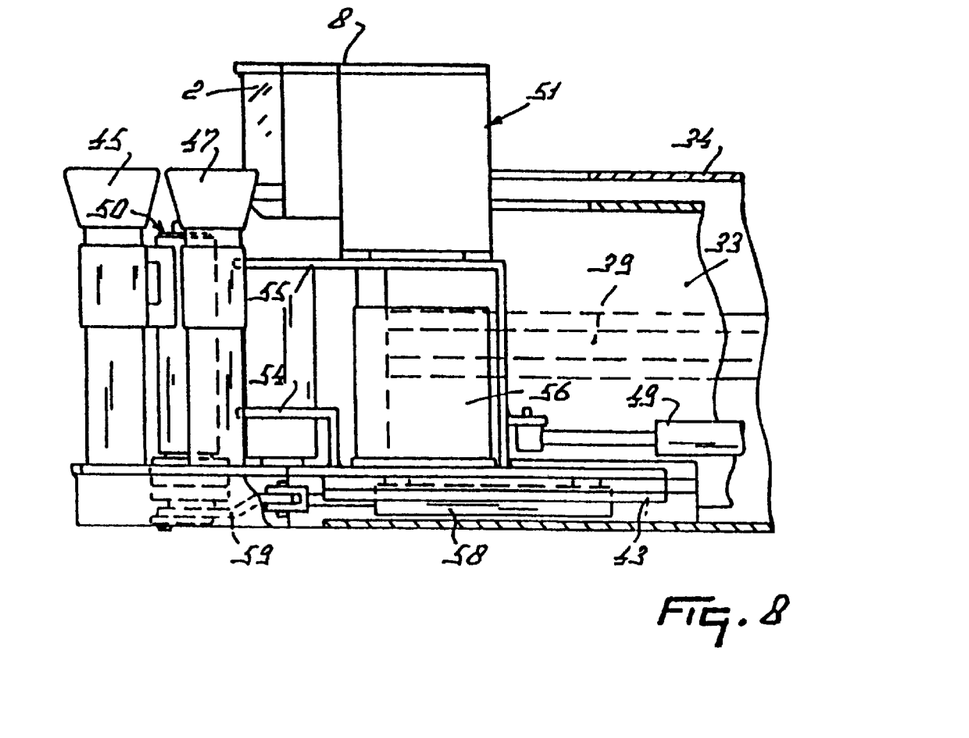
FIG. 8 is a side cross-sectional view of FIG. 7.

Because of its limited dimensions, great scanning angle, long life, low cost and rapid and accurate functioning, the sensor apparatus according to the invention is particularly suitable for use in a milking apparatus. By way of example, there is shown how the sensor apparatus may be incorporated in the milking implements set out and shown in EP-A-0360354, for which purpose FIGS. 4 and 5 of that publication are set forth herewith as FIGS. 7 and 8. Apart from the parts designated by the reference numerals 51, 52, 53 and 57, FIGS. 7 and 8 are accurate copies of FIGS. 4 and 5 respectively from EP-A-0360354. The sensor apparatus according to the invention is now indicated in FIGS. 7 and 8 by the reference numeral 51. The other reference numerals correspond to EP-A-0360354 and for their meaning and function reference is made to said publication. It is also to be clearly understood that FIGS. 1 to 3 of EP-A-0360354 and the corresponding description disclose how details of FIGS. 7 and 8 set forth herewith may be incorporated in the milking implement.

In the foregoing disclosure of the invention, the preferred embodiments utilize laser beams. Alternatives include sound (e.g. ultrasonic sound or audible sound), visible light, radio and radar waves. Two or more separate, preferably parallel, rays or beams of rays may also be produced by means of a single transmitter element, in which case the beam may be divided by, for example, means of a prism or the beam may be transmitted in a glass fiber cable, whereafter that cable is divided to produce a plurality of beams. The difference in properties between the rays or beams of rays may also be obtained e.g. by using for one or both rays or beams of rays a respective band-pass filter, so that after passage through the filter, their properties differ. By means of the directional element, a ray or beam of rays is moved through the space to be scanned. The function of the directional element may also be fulfilled by pivoting housing 1 in a reciprocating manner, so that in that case at the place of the rotatable reflector 3 there is arranged e.g. a fixed reflector directing both rays or beams of rays to different places in the space.

Although a ray or beam of rays produced by the transmitter element is preferred, most preferably laser beams, in specific embodiments it is also possible to utilize a strongly diverging beam of rays, such as a beam of rays covering the entire space to be scanned at one time. The ray or beam of rays may also be polarized to advantage as well as non-polarized.

According to a further variant, the intensity of the ray or beam of rays transmitted by the sensor or the sensitivity of the receiver element or the quantity of the ray or beam of rays provided to the receiver element or any combination thereof, may be adapted to the nature of the object of which the position is to be determined. The principle for doing so is based on the one hand on the insight that the intensity of the signal and the sensitivity of the receiver element should be adapted to each other to avoid "overradiating" the receiver element. On the other hand, this principle is based on the insight that the intensity of the signal has to be adapted to the directing velocity of the directional element to avoid loss due to diffusion with laser light. In the case of this variant, if it is decided to adjust the intensity of the transmitted ray or beam of rays depending on the nature of an object (that is color in case of a teat), it is possible to adapt the directing velocity of a directional element 3 (that is the rotating movement thereof) accordingly, so that the higher the scanning velocity, the more the ray or beam of rays is intense and consequently the rotation speed of the mirror 3 is high. Controlling the intensity of the signal to be supplied to the receiver element is possible by means of an attenuation element arranged between the receiver element and the reflector.

Although we have disclosed the preferred embodiments of our invention, it is to be understood that it is capable of other adaptations and modifications within the scope of the following claims:

Having disclosed our invention, what we claim as new and to be secured by Letters Patent of the United States of America is:

1. A sensor apparatus for determining the position of an object present in a space relative to the sensor apparatus, which sensor apparatus comprises transmitter means that transmits a ray or beam of rays, receiver means to receive reflections from said object from said ray or beam of rays transmitted by said transmitter means and reflected by the object, a first directional element which includes directing means directing two separate rays or beams of rays emanating from said transmitter means consecutively to different subareas in said space, and scanning means for scanning said space substantially simultaneously in at least two of said subareas thereof.

2. A sensor in accordance with claim 1, wherein said receiver means is arranged substantially below a lower side of said first directional element.

3. A sensor apparatus in accordance with claim 1, comprising distinguishing means for producing a ray or beam of rays having one property which is distinct from any property of the other rays or beams of rays.

4. A sensor apparatus in accordance with claim 3, wherein said one property of said first mentioned ray or beam of rays which is distinct from any property of the other rays or beams of rays comprises a polarization of said first mentioned ray or beam of rays.

5. A sensor in accordance with claim 3, wherein the property of said first mentioned ray or beam of rays which is distinct from any property of said other rays or beam of rays comprises the amplitude of said first mentioned ray or beam of rays.

6. A sensor apparatus in accordance with claim 3, wherein said directing means directs two separate rays or beams of rays so that they are orientated so as to be substantially parallel.

7. A sensor apparatus in accordance with claim 3, wherein said receiver means is adapted to receive reflections from each of said rays or beams of rays and to recognize said rays by their respective distinctive properties.

8. A sensor in accordance with claim 7, wherein the distinctive properties of said ray or beams of rays are their frequencies.

9. A sensor apparatus for determining the position of an object present in space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element directing the ray or beam of rays emanating from said transmitter means consecutively to different areas in said space, and scanning means for scanning said space substantially simultaneously in at least two subareas thereof, said transmitter means comprising a first transmitter element and a second transmitter element and said receiver means comprising a first receiver element and a second receiver element, said ray or beam of rays comprising separate rays or beams of rays, one of said separate ray or beam of rays emanating from said first transmitter element and another said separate ray or beam of rays emanating from said second transmitter element, reflections from said one said separate ray or beam of rays being received by said first receiver element and reflections from said other separate ray or beam of rays being received by said second receiver element.

10. A sensor apparatus for determining the portion of an object present in space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element directing the ray or beam of rays emanating from said transmitter means consecutively to different areas in said space, scanning means for scanning said space substantially simultaneously in at least two subareas thereof, a housing which contains said transmitter means, said receiver means and said first directional element, and a reflection element also contained in said housing in a fixed position relative to said housing, said reflection element disposed in said housing to deflect the path of said ray or beam of rays between said transmitter means and said first directional element.

11. A sensor apparatus in accordance with claim 10, wherein said reflection element comprises a substantially planar reflective surface which receives said ray or beam of rays from said transmitter means at an angle not exceeding approximately 45° relative to said reflective surface.

12. A sensor in accordance with claim 10, wherein said reflection element is disposed in said housing to deflect the path of reflections from said ray or beam of rays between said first directional element and said receiver means.

13. A sensor apparatus in accordance with claim 12, wherein the same reflection element that deflects the ray or beam of rays transmitted by said transmitting means also deflects the reflections received from said object to said receiver means.

14. A sensor apparatus for determining the position of an object in a space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element for directing the ray or beam of rays emanating from said transmitter means consecutively to different areas in said space, and scanning means for scanning said space substantially simultaneously in at least two subareas thereof, said transmitter means and said receiver means each being provided with a respective deflection element.

15. A sensor apparatus in accordance with claim 14, wherein said deflection element is arranged to deflect the path of said ray or beam of rays and reflections of said ray or beam of rays from said object through an angle which does not exceed approximately 90°.

16. A sensor apparatus for determining the position of an object in a space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element for directing the ray or beam of rays emanating from said transmitter means consecutively to different areas in said space, and scanning means for scanning said space substantially simultaneously in at least two subareas thereof, said transmitter means comprising two transmitter elements spaced apart in a housing and said receiver means comprising two receiver elements spaced apart in said housing, the apparatus further comprising two further reflection elements, one said reflection element being disposed in said housing on one side of said first directional element and the other said reflection element being disposed on the other side of said first directional element in said housing.

17. A sensor apparatus for determining the position of an object in a space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element for directing the ray or beam of rays emanating from said transmitter means consecutively to different areas in said space, and scanning means for scanning said space substantially simultaneously in at least two subareas thereof, said transmitter means and said receiver means being arranged to be spaced one above the other.

18. A sensor apparatus for determining the position of an object in a space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element for directing the ray or beam of rays emanating from said transmitter means consecutively to different areas in said space, and scanning means for scanning said space substantially simultaneously in at least two subareas thereof, said transmitter means being arranged at substantially the same level as said first directional element.

19. A sensor apparatus for determining the position of an object in a space relative to the sensor apparatus, which sensor apparatus comprises transmitter means that transmits a ray or beam of rays, receiver means to receive reflections from said object of said ray or beam of rays transmitted by said transmitter means and reflected by the object, a first directional element for directing the ray or beam of rays emanating from said transmitter means consecutively to different areas in said space, scanning means for scanning said space substantially simultaneously in at least two subareas thereof, and a housing which contains said transmitter means and said first directional element, said transmitter element being substantially fixably arranged relative to said housing, and said first directional element being movably supported in said housing.

20. A sensor apparatus for determining the position of an object present in a space relative to the sensor apparatus, the sensor apparatus comprising a housing, a transmitter means fixedly mounted in said housing for transmitting therefrom a ray or beam of rays, a receiver means fixedly mounted in said housing to receive reflections of said ray or beam of rays from said object, a directional element movably mounted in said housing for directing said ray or beam of rays emanating from said transmitter means consecutively to different areas in said space and for further directing reflections from said object of said ray or beam of rays to said receiver means, said directional element being movable relative to said housing so as to scan said space.

21. A sensor apparatus in accordance with claim 20, wherein said transmitter means is aligned with said directional element to radiate said ray or beam of rays directly to said directional element and said receiver means is aligned with said directional element to receive reflections of said ray or beam of rays directly from said directional element.

22. A sensor in accordance with claim 20, wherein said ray or beam of rays produced by said transmitter means comprises a laser beam.

23. A sensor apparatus in accordance with claim 20, wherein said receiver means comprises a diode sensor.

24. A sensor apparatus in accordance with claim 20, comprising adjustment means for adjusting the intensity of said ray or beam of rays emanating from said transmitter means.

25. A sensor apparatus in accordance with claim 20, comprising an evaluation device associated with said receiver means to receive data from said receiver means concerning the area where said reflections from said ray or beam of rays are received by said receiver means, said data enabling said evaluation device to determine the position of the sensor apparatus relative to said object.

26. A sensor apparatus in accordance with claim 25, wherein said receiver means comprises coplanar detector elements which are adjacent to each other and sensitive to reflections from said object of said ray or beam of rays, said detector elements providing detection data corresponding to the intensity of said reflections of said ray or beam of rays from said object to said evaluation device.

27. A sensor in accordance with claim 20, wherein said receiver means comprises a focusing element for focusing reflections of said ray or beam of rays to be received by said receiving means.

28. A sensor in accordance with claim 27, wherein said receiver means includes a receiver element and the focal distance of said focusing element is fixed relative to said receiver element.

29. A sensor apparatus in accordance with claim 20, wherein said housing has a width, depth and height which are each approximately one hundred millimeters.

30. A sensor apparatus in accordance with claim 29, wherein said directional element comprises a rectangular member with reflective surfaces on both sides and which is mounted in said housing so as to be rotatable about a longitudinal central axis therein, said rectangular member having a width of approximately twenty-five millimeters.

31. A sensor apparatus in accordance with claim 20, wherein said housing comprises a window through which said ray or beam of rays emanating from said transmitter means pass and through which further reflections of said ray or beam of rays to be received by said receiver means pass.

32. A sensor apparatus in accordance with claim 31, comprising a cover plate for said window which is composed of material penetrable to said ray or beam of rays and reflections therefrom, said cover plate being curved.

33. A sensor apparatus in accordance with claim 32, wherein said cover plate coincides, at least in part with a cylindrical surface, the axis of which substantially coincides with said axis of rotation of said directional element.

34. A sensor apparatus in accordance with claim 20, which comprises a second directional element which transmits reflections from said ray or beam of rays of said object to said receiver means.

35. A sensor apparatus in accordance with claim 34, wherein said first mentioned and said second directional elements are integrated whereby they move together relative to said housing.

36. A sensor apparatus in accordance with claim 34, wherein said first mentioned and said second directional elements are movably arranged in said housing in the path of said ray or beam of rays and reflections therefrom between said object on one hand and said transmitter means and said receiver means on the other hand.

37. A sensor apparatus in accordance with claim 36, wherein said first mentioned directional element and said second directional element comprise a radiation reflection element.

38. A sensor apparatus in accordance with claim 37, wherein said radiation reflection element comprises a reflective plane and said first mentioned and said second directional elements are rotatable about an axis extending parallel to said reflective plane.

39. A sensor apparatus for determining the position of an object present in a space relative to the sensor apparatus, which comprises transmitter means for producing a ray or beam of rays that will be received by said object, receiver means that receive reflections of said ray or beam of rays from said object, a directional element which directs said ray or beam of rays consecutively to different areas of said space and further directs the reflection of said ray or beam of rays from said object to said receiver means and adjustment means for adjusting the intensity of said ray or beam of rays reflected from said object and received by said receiver means.

40. A sensor apparatus in accordance with claim 39, wherein said directional element is rotated and comprising regulation means for regulating the rpm of said directional element.

41. A sensor apparatus for determining the position of an object present in a space, relative to the sensor apparatus, comprising transmitter means for producing a ray or beam of rays to impinge on said object, receiver means to receive reflections of said ray or beam of rays reflected from said object, a directional element for directing said ray or beam of rays emanating from said transmitter means consecutively to different areas of said space and for further directing reflections of said ray or beam of rays from said object to said receiver means, and means for rotating said directional including regulating means for regulating the rpm of said directional element.

42. A method of determining the position of an object present in a space comprising transmiting two rays or beams of rays having distinctive characteristics, directing said rays or beams of rays to scan two subareas of said space separately, receiving reflections from each said ray or beam of rays from said object, converting the reflections of each said ray or beam of rays so received into data and determining the position of the sensor apparatus relative to said object from said data.

43. A method in accordance with claim 42, wherein each said ray or beam of rays is transmitted from transmitter means which is fixedly arranged relative to said space.

44. A method of determining the position of an object present in space comprising transmitting two separate rays or beams of rays to scan a respective said subarea of said space, directing said rays or beams of rays to scan said respective subareas of said space separately, receiving reflections from each said ray or beam of rays from said object when said object is in the said respective subspace thereof, converting the reflections of each said ray or beam of rays so received into data and determining the position of the sensor apparatus relative to said object from said data.

45. A method in accordance with claim 44, wherein said subareas scanned by a respective separate ray or beam of rays overlap approximately by two degrees.

46. A method of determining the position of an object present in space comprising transmitting rays or beams of rays which have distinct physical characteristics consecutively into different areas of said space from transmitter means in a sensor apparatus which is fixed relative to said space, relaying each said ray or beam of rays by a directional element spaced from said transmitter means which is moving so that it directs each said ray or beam of rays consecutively to two different areas of said space, receiving reflections of each said ray or beam of rays which are reflected from said object, converting said reflections into signals and evaluating said signals to deterine the position of the sensor apparatus relative to said object.

47. A method of determining the position of an object present in space relative to a sensor apparatus comprising transmitting a ray or beam of rays consecutively into two different areas of said space from a transmitter which is fixed relative to said space, each of said areas being scanned being substantially two-dimensional, relaying said ray or beam of rays by a directional element spaced from said transmitter so that it transmits said ray or beam of rays consecutively to two different areas of said space, receiving reflections of said ray or beam of rays which are reflected from said object, converting said reflections into a signal and evaluating said signal to determine the position of the sensor apparatus relative to said object.

48. A method in accordance with claim 47, wherein said areas being scanned together comprise an angle sector which is at least approximately one hundred degrees.

49. A method in accordance with claim 47, wherein said different areas being scanned together comprise an angle sector in a range of approximately one hundred, twenty degrees to one hundred, eighty degrees.

50. An apparatus for milking animals, comprising a milking compartment which is provided with a milking robot for automatically connecting a teat cup to a teat of an animal to be milked in said milking compartment, said robot including a search device for determining the position of said teat relative to said teat cup, said search device comprising a sensor apparatus comprising transmitter means comprising two transmitter elements for transmitting two rays or beams of rays into a space where a said teat of an animal in said milking compartment may be located, receiver means for receiving reflections of said rays or beams of rays, converting means for converting said reflections so received into a signal and evaluation means for evaluating the signal so received to determine the location of a said said teat in said space relative to the search device, said transmitter means comprising two transmitter elements, each said transmitter element producing a ray or beam of rays which, as received in said space and reflected from a said teat, is distinctive from the ray or beam of rays produced by the other said transmitter element, said receiver means comprising two receiver elements which separately receive and provide a distinctive signal to said evaluation means depending upon the distinctive reflections received thereby from said space.

51. An apparatus in accordance with claim 50, wherein said distinctive reflections received by respective said receiver elements are reflections from substantially separated areas of said space.

* * * * *